(12) United States Patent
Colombo

(10) Patent No.: US 6,269,946 B1
(45) Date of Patent: Aug. 7, 2001

(54) PACKAGING SYSTEM FOR PRESERVING PERISHABLE ITEMS

(75) Inventor: Edward A. Colombo, Penfield, NY (US)

(73) Assignee: Tres Fresh LLC, Penfield, NY (US)

( * ) Notice: Subject to any disclaimer, the term of this patent is extended or adjusted under 35 U.S.C. 154(b) by 0 days.

(21) Appl. No.: 09/684,381

(22) Filed: Oct. 7, 2000

Related U.S. Application Data

(63) Continuation-in-part of application No. 09/609,798, filed on Jul. 3, 2000, which is a continuation-in-part of application No. 09/519,105, filed on Mar. 6, 2000, now Pat. No. 6,213,294, which is a continuation-in-part of application No. 09/342,844, filed on Jun. 29, 1999, now Pat. No. 6,112,890, and a continuation-in-part of application No. 09/196,450, filed on Nov. 19, 1998, now Pat. No. 6,210,725, and a continuation-in-part of application No. 09/182,754, filed on Oct. 29, 1998, now Pat. No. 6,023,915.

(51) Int. Cl.[7] .................................................. B65D 81/20
(52) U.S. Cl. ........................ 206/213.1; 53/432; 426/124; 426/129
(58) Field of Search ................. 53/432; 206/205, 206/213.1, 524.8, 557, 558, 561, 564; 426/118, 124, 129

(56) References Cited

U.S. PATENT DOCUMENTS

| | | | |
|---|---|---|---|
| 3,521,806 | * 7/1970 | Esty | 206/213.1 |
| 3,574,642 | * 4/1971 | Weinke | 426/129 |
| 3,681,092 | * 8/1972 | Titchenal et al. | 206/524.8 |
| 4,247,517 | * 1/1981 | Sanderson et al. | 206/524.8 |
| 4,372,921 | * 2/1983 | Sanderson et al. | 206/524.8 |
| 4,548,824 | * 10/1985 | Mitchell et al. | 206/524.8 |
| 5,561,915 | * 10/1996 | Vandergriff | 206/213.1 |
| 5,628,404 | * 5/1997 | Hendrix | 206/524.8 |
| 5,698,250 | * 12/1997 | DelDuca et al. | 426/129 |
| 5,705,210 | * 1/1998 | Sillince et al. | 53/432 |
| 5,711,978 | * 1/1998 | Breen et al. | 426/129 |
| 5,811,142 | * 9/1998 | DelDuca et al. | 426/129 |
| 5,916,613 | * 6/1999 | Stockley, III | 426/124 |
| 5,948,457 | * 9/1999 | DelDuca et al. | 426/129 |
| 6,054,153 | * 4/2000 | Carr et al. | 426/129 |
| 6,132,781 | * 10/2000 | Carr et al. | 426/129 |

* cited by examiner

*Primary Examiner*—Jim Foster
(74) *Attorney, Agent, or Firm*—Greenwald & Basch LLP; Howard J. Greenwald

(57) ABSTRACT

A modified atmosphere package for storing oxygen sensitive goods which contains a gas permeable tray for holding the oxygen-sensitive goods and a gas permeable film wrapped over the tray. The tray is made from foam material; at least about 20 volume percent of said foam material is open cell foam. A hinged flap is connected to a wall of the tray and contains a receptacle in which a source of carbon dioxide (such as dry ice) may be disposed.

14 Claims, 14 Drawing Sheets

PACKAGING SYSTEM FOR PRESERVING PERISHABLE ITEMS

CROSS-REFERENCE TO RELATED PATENT APPLICATIONS

This application is a continuation-in-part of applicant's patent applications U.S. Ser. No. 09/609,798, filed on Jul. 3, 2000, pending, which was a continuation-in-part of U.S. Ser. No. 09/519,105, filed on Mar. 6, 2000, U.S. Pat. No. 6,213,294, which was a continuation-in-part of U.S. Ser. No. 09/342,844, filed on Jun. 29, 1999, U.S. Pat. No. 6,112,890. This case is also a continuation-in-part of patent applications U.S. Ser. No. 09/196,450 (filed Nov. 19, 1998), U.S. Pat. No. 6,210,725 and U.S. Ser. No. 09/182,754 (filed Oct. 29, 1998), U.S. Pat. No. 6,023,915.

TECHNICAL FIELD

A packaging system for preserving perishable items which comprises a tray made from foam, and a barrier bag enclosing said tray.

BACKGROUND OF THE INVENTION

Applicant's U.S. Pat. No. 6,112,890 describes a packaging system for preserving perishable items; this patent, and prior art cited in it, are the most relevant references known to applicant regarding the technology claimed in this patent application.

It is an object of this invention to provide an improved packaging system for preserving perishable goods.

SUMMARY OF THE INVENTION

In accordance with this invention, there is provided a packaging system for preserving a perishable item which comprised of a tray comprised of open-cell foam covered with a gas-permeable film, and such tray covered with such film is disposed within a sealed, oxygen-impermeable barrier bag consisting of an inert atmosphere containing less than about 0.05 volume percent of oxygen. The tray contains a hinged section attached to at least one edge of the tray in which a receptacle is formed for the receipt of source of carbon dioxide.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DESCRIPTION OF THE PREFERRED EMBODIMENTS

This specification contains two separate sections. In section one of the specification, the embodiments of FIGS. 1–9 are described. In section two of this specification, the embodiment of FIG. 10 is described.

One Preferred Packaging System of the Invention

Figure 1:
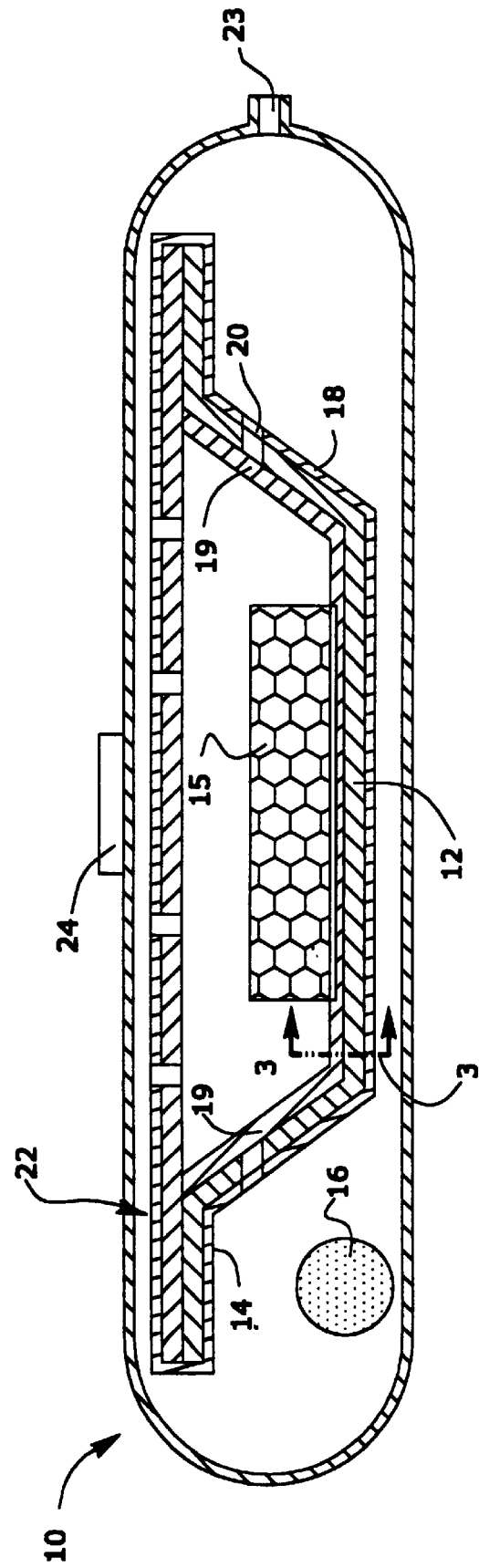
FIG. 1 is a sectional view of one preferred packaging system of the invention.

FIG. 1 is a sectional view of one preferred packaging system 10 which is comprised of a tray 12 which, in the preferred embodiment depicted, includes flanges 14 around the perimeter of such tray 12. A perishable good or goods 15 is disposed within tray 12.

The perishable goods which may advantageously be protected by the packaging system 10 of this invention include oxygen-sensitive food such as, e.g., red meat (veal, beef, pork, etc.), pasta, cooked food, and the like. Alternatively, one may preserve perishable non-food items such as photographic film, computer components, inorganic materials susceptible to oxidation, etc.

In the preferred embodiment depicted in FIG. 1, a skin layer 19 is contiguous with and attached to the bottom surface of the tray and preferably up the side of the tray to the flanges 14.

In the preferred embodiment depicted in FIG. 1, a gas permeable film material 18, which may include slits or perforations 20, covers the perishable goods 15. This skin layer 19 is illustrated more clearly in FIG. 3.

Referring again to FIG. 1, it will be seen that the tray 12 which is overwrapped with gas permeable film material 18 is disposed within a barrier bag 22 which surrounds the tray 12 and which preferably is made of a substantially impermeable material. This barrier bag is attached to a one-way valve 24, which will be described in greater detail elsewhere in this specification.

From about 10 to about 150 grams of solid carbon dioxide 16, which may be in the form a flakes, one or more pellets, an irregular shape, etc., are disposed outside of tray 12 but within barrier bag 22.

The barrier bag 22, prior to the time it is sealed, contains an opening 23.

Figure 2A:
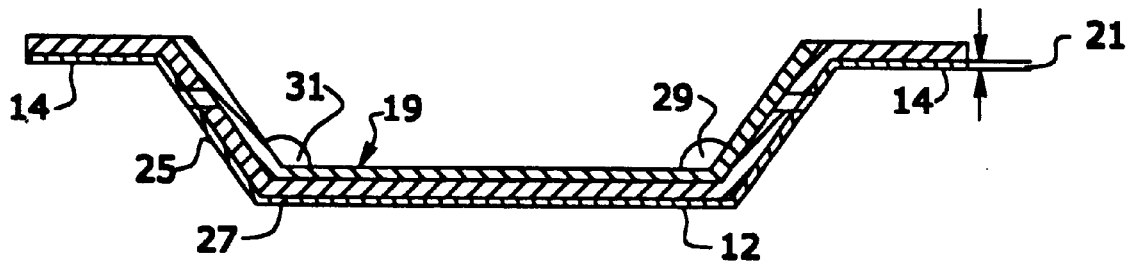
FIGS. 2A, 2B, 2C, 2D, and 2E schematically illustrate one means of preparing and using the packaging system of FIG. 1.

FIG. 2A is a sectional view of tray 12 attached to skin layer 19. The tray 12 is comprised of at least 90 weight percent of foam material. In one preferred embodiment, the foam material is open-cell foam which contains at least about 20 volume percent of open cells.

As is known to those skilled in the art, an open-cell cellular plastic is a cellular plastic in which there is a substantial number of interconnected cells; see, e.g., A.S.T.M. D883. Reference also made by had to U.S. Pat. No. 5,798,409 (open cell foams of polystyrene and polyurethane), U.S. Pat. No. 5,784,845 (open cell foam material made from alkenyl aromatic polymer material), U.S. Pat. No. 5,646,193 (rigid open cell foam material), U.S. Pat. Nos. 5,557,816, 5,475,890, 5,434,024 (open cell foam material of polyvinyl chloride, or polyisocyanate, or polyphenol, or polypropylene), U.S. Pat. Nos. 5,348,587, 5,343,109, 5,239,723, 5,139,477 (polyethylene open cell foam material), U.S. Pat. Nos. 4,739,522, 4,395,342 (open cell foam material made from cellulose acetate, or phenol-formaldehyde, or cellular rubber), etc. The disclosure of each of these United States patents is hereby incorporated by reference into this specification.

It is preferred that the open cell foam material be made from a resin selected from the group consisting of polyethylene, polyvinyl chloride, polyacrylonitrile (such as the "BAREX" resin sold by the British Petrolem/Amoco company), poly(ethylene terephthalate), polystyrene, rubber-modified polystyrene, ethylenepolystyrene, interpolymers (such as "INDEX" interpolymers sold by Dow Chemical Corporation of Midland Mich.), polypropylene, polyurethane, polyisocyanurate, epoxy, urea formaldehyde, rubber latex, silicone, fluropolymer or copolymers thereof or blends thereof, and in general any other suitable resin, resin mixture, or any foamable composition which can be made with an open cell structure such as, e.g., materials made using a silane peroxide catalyst system (sold by the Sentinel Foam company or Hyanis, Mass.).

As is well known to those skilled in the art, one may vary the degree to which a foam material contains open-cell structure by the process taught by applicant in his 1977 article entitled "Controlling the Properties of Extruded Polystyrene Foam." This article was presented at the Proceedings of the International Conference on Polymer Processing, which was held at the Massachusetts Institute of Technology, Cambridge, Mass., in August 1977. This proceedings were published in 1977 in a book edited by Nam P. Suh and Nak-Ho Sung entitled "Science and Technology of Polymer Processing" (The MIT Press, Cambridge, Mass., 1977); and a description of means to control the concentrator of open cells appeared on page 410 of this book. In particular, the correlation between the concentration of open cells produced in the foam and the melt temperature of the resin/blowing agent mixture used, was discussed.

Referring again to FIG. 2A, the tray 12 is comprised of foam material which contains at least about 20 volume percent of open cells. In one preferred embodiment, the foam material contains at least about 30 volume percent of open cells. It is even more preferred that the foam material contain from about 30 to about 90 volume percent of open cells and, even more preferably, from about 45 to about 90 volume percent of open cells. The extent to which a foam material contains open-cell foam may be determined by A.S.T.M. Standard Test D2856–94, "Test Method for Open-Cell Content of Rigid Cellular Plastics by the Air Pycnometer."

The open-cells in the foam contain a gas phase with gases which are substantially identical to the gases in ambient air. Thus, the open-cells generally contain a gas phase comprised of from about 19 to about 22 volume percent of oxygen (depending upon the altitude) and from about 78 to about 81 volume percent of nitrogen. In general, such gas phase contains from about 20.5 to about 21 volume percent of oxygen and from about 79 to about 79.5 volume percent of nitrogen. However, after the open-cells in the gas tray have been treated by the process of this invention, they preferably contain less than about 0.05 volume percent of oxygen.

FIGS. 2B, 2C, 2D, and 2E illustrate how use the tray depicted in FIG. 2A can be used to make the structure depicted in FIG. 1. For the sake of simplicity of representation, much of the detailed description of the tray contained in FIG. 2A has been omitted from FIGS. 2B, 2C,2D, and 2E.

Figure 2B:
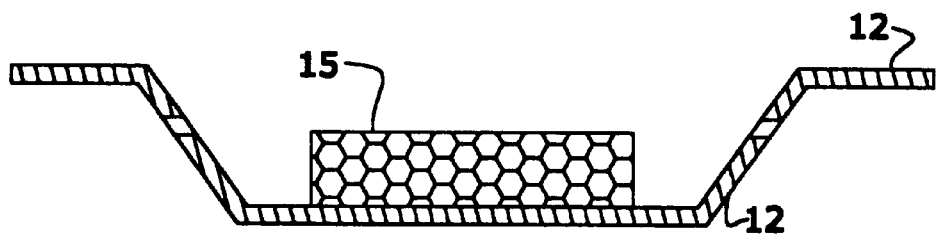
Figure 2C:
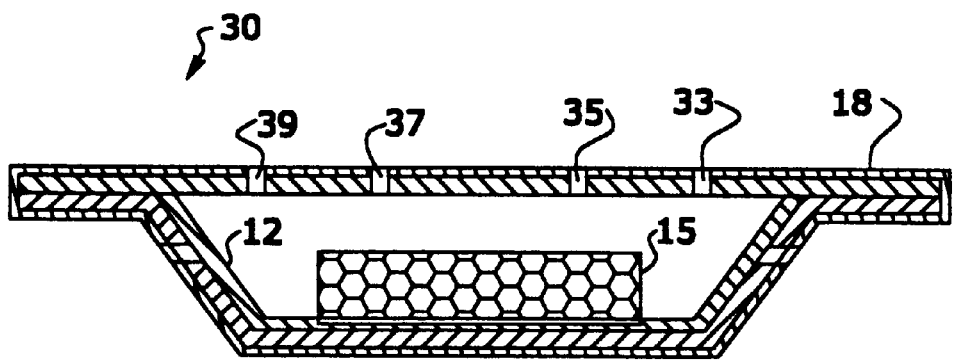

After the tray 12 has been fabricated (see FIG. 2A), the good or goods 15 are placed in the tray and then wrapped either manually or automatically with a gas permeable film material 18, or other suitable means, to holds the goods 15 in place, thereby forming wrapped tray 30 (see FIG. 2C).

The open-cell foam material which comprises tray 12 have as an average cell diameter of from about 0.0001 to about 0.030 inches and, more preferably, from about 0.002 to about 0.008 inches. In one preferred embodiment, the cell diameter of such cells is from about 0.003 to about 0.007 inches.

The average cell diameter of a foam may be determined in accordance with the procedure described in applicant's U.S. Pat. Nos. 3,953,739 and 4,329,052, the disclosures of which are hereby incorporated by reference into this specification. One may also use one or more of the methods disclosed in other United States patents, such as, e.g., U.S. Pat. Nos. 5,912,729, 5,817,704, 5,810,964, 5,798,065, 5,795,680, 5,790,926, 5,786,401, 5,770,634, 5,7532,717, 5,912,729, and the like. The disclosure of each of these United States patents is hereby incorporated by reference into this specification.

Referring again to FIG. 1A, the tray 12 has walls with a thickness 21 of from about 0.025 to about 0.5 inches and, preferably, from about 0.040 to about 0.15 inches. In one embodiment, the thickness 21 is from about 0.04 to about 0.1 inches. The thickness of the sidewalls 23 and 25 of tray 12 may be equal to or less than the thickness of the bottom surface 27 of tray 12. In one embodiment, the thickness of sidewalls 23 and 25 is from 25 to about 50 percent of the thickness of the bottom surface 27.

In one preferred embodiment, illustrated in FIG. 2A, the bottom surface 27 of tray 12 forms an interior angle (29 or 31) between sidewalls 23 or 25 of from about 1 to about 90 degrees and, preferably, from about 25 to about 50 degrees. Angles 29 and 31 may be the same or different.

Referring again to FIG. 2A, the tray 12 preferably has a density of from about 0.1 to about 55 pounds per cubic foot and, preferably from about 1 to about 10 pounds per cubic foot, and more preferably from about 1.5 to about 6 pounds per cubic foot. It is even more preferred that the density be from about 2.0 to about 5.0 pounds per cubic foot. In one embodiment, the density of tray 12 is from about 2 to about 3 pounds per cubic foot.

Referring again to FIG. 2A, it will be seen that tray 12 is attached to a skin 19; the means for attaching this skin 19 will be discussed elsewhere in this specification. The thickness of skin 19 is preferably from about 0.0005 to about 0.01 inches and, more preferably, from about 0.002 to about 0.005 inches.

In FIGS. 2B through 2E, tray 12 is depicted in various combination with other elements. However, for the sake of simplicity of representation, many of the details of tray 12 depicted in FIG. 2A have been omitted in these latter Figures.

As is illustrated in FIG. 2B, the perishable goods 15 are placed within tray 12, either manually or automatically. In one embodiment, not illustrated, an absorbent pad is placed between the goods 15 and the bottom of the tray in order to absorb excess juices exuded from the goods 15.

Referring to FIG. 2C, a gas permeable film material 18 adapted to pass both oxygen and carbon dioxide is wrapped around the entire tray 12. The film material may be adhered to the tray because of its "cling properties," and/or it may be heat-treated to cause it to adhere to the tray; in each either event, the film 18 is contiguous with the sides and the bottom of tray 12 and encloses the perishable goods 15. Thus, as is disclosed in U.S. Pat. No. 5,698,250, the film 18 may contain additives which allow the film to cling to itself. This film generally has a thickness ranging from about 0.5 mil to about 1.5 mils.

These gas-permeable films are well known to those skilled in the art and are described, e.g., in U.S. Pat. Nos. 5,888,597, 5,885,699, 5,852,152 (ethylene/vinyl acetate film and ethylene/acrylic acid film), U.S. Pat. Nos. 5,840,807, 5,839,593, 5,804,401, 5,780,085, 5,759,712, 4,056,639, 4,011,348, 3,867,558, 3,857,981, 3,728,135, and the like. The disclosure of each of these United States patents is hereby incorporated by reference into this specification.

In one preferred embodiment, film 18 is a polyvinyl chloride film supplied by the Borden Packaging and Industrial Products company of North Andover, Mass as "Resinite." This film 18 has an oxygen permeability of from about 1100 to about 1400 cubic centimeters per 100 square inches per 24 hours, as measured by the Mocori Controls Oxtran 100 machine measured at 23 degrees Centigrade. The film has a carbon dioxide permeability of from about 12,400 to about 13,4000 cubic centimeters per 100 square inches per 24 hours as measured by a Linde Cell at 23 degrees Centigrade and 1 atmosphere pressure.

In the preferred embodiment depicted in FIG. 2C, film 18 is comprised of perforations 33, 35, 37, and 39. In this embodiment, it is preferred that each of such perforations have a maximum cross-sectional dimensional of less than about 0.05 inches. When such perforations are present, it is preferred that from about 1 to about 4 of them occur per square inch of surface.

Figure 2D:
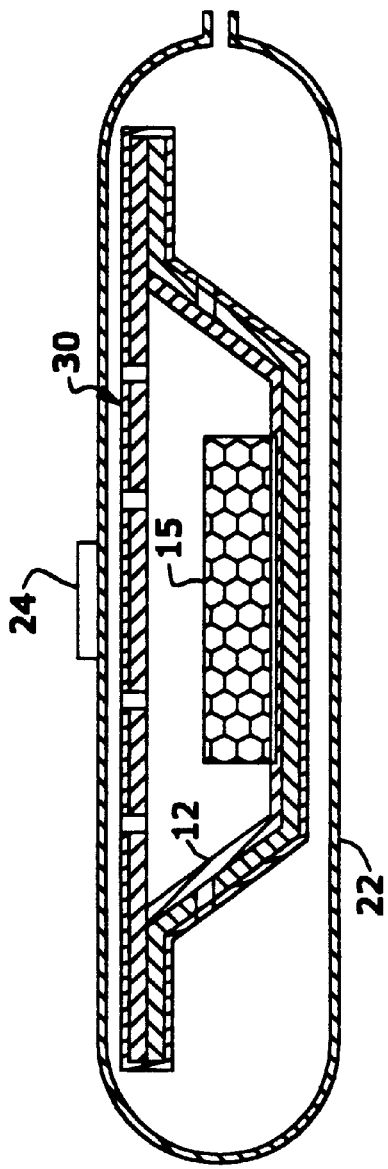

Referring to FIG. 2D, the wrapped tray 30 (see FIG. 2C) is wrapped in an oxygen barrier bag 22 which, in the preferred embodiment depicted, is preferably shaped similarly to a typical bag with an open end into which to insert the wrapped tray. Such oxygen barrier bags are well known to those skilled in the art and are described, e.g., in U.S. Pat. Nos. 5,862,947, 5,855,626, 5,811,027,5,799,463, 5,798,055, 5,780,085, 5,753,182, 5,711,978, 5,700,554, 5,667,827, 5,583,047, 5,573,801, 5,573,797, 5,529,833, 5,350,622, 5,346,644, 5,227,255, 5,203,138, 5,195,305, 4,857,326, 4,605,175, 4,082,829, 3,953,557, and the like. The disclosure of each of these United States patents is hereby incorporated by reference into this specification.

In one preferred embodiment, the barrier bag described in column 4 of U.S. Pat. No. 5,698,250 may be used. This bag is commercially available as product number 325C44-EX861B from the PrintPak, Inc. company of Atlanta, Ga.

In another preferred embodiment, the barrier bag used is a biaxially oriented nylon film coated with an oxygen barrier coating (such as polyvinylidene chloride) and having a thickness of from about 0.00072 to about 0.00112 inches. Such a bag is commercially available from the Allied Signal Corporation (of New Jersey) as "Capron Emblem 1530" or "Capron Emblem 2530."

Regardless of the particular barrier bag used, it is preferred that it have an oxygen permeability of less than 5 cubic centimeters per 100 square inches per 24 hours, as measured by a suitable gas permeability measuring device, such as the aforementioned Mocon Controls Oxtran 100 machine; measurements are taken under ambient conditions. This test method is well know, being described in A.S.T.M. Standard Test D-1434 "Test Method for Determining Gas Permeability Characteristics of Plastic Film and Sheeting." Reference may also be had to U.S. Pat. Nos. 5,913,445, 5,882,518, 5,769,262, 5,684,768, and the like. The disclosure of each of these United States patents is hereby incorporated by reference into this specification.

Referring again to FIG. 2D, the barrier bag 22 is preferably operably connected to a pressure relief valve 24. The pressure relief valve 24 is adapted to open and allow gas disposed within barrier bag 22 when the pressure within barrier bag 22 is from about 0.05 to about 1.0 pounds per square inch gauge and, more preferably, from about 0.1 to about 0.2 pounds per square inch gauge. In an even more preferred embodiment, the valve 24 is adapted to allow gas disposed within barrier bag 22 to vent to the outside when the pressure within such bag is from about 0.12 to about 0.14 pounds per square inch gauge.

The valve 24, after it is has opened to vent gas from the barrier bag 22, closes when the internal pressure drops within the range of from about 0.01 to about 0.04 pounds per square inch gauge.

Pressure sensitive gas valves for releasing gas from a sealed flexible pouch, such as valve 24, are well known to those skilled in the art. See, for example U.S. Pat. Nos. 5,059,036, 5,419,638, 5,048,846, 4,653,661, 4,690,667, and the like. The disclosure of each of these United States patents is hereby incorporated by reference into this specification.

In one preferred embodiment, the pressure sensitive gas valve is sold by the Plitek, Inc. company of 681 Chase Avenue, Elk Grove Village, Ill. 60007; see, e.g., a publication by Plitek (entitled "Plitek Pressure Relief Valve") which was published on Jul. 8, 1991. A copy of this publication is in the file history of U.S. Pat. No. 5,419,638 of Mark D. Jamison.

The valve 24 may be incorporated into the gas barrier bag 24 by conventional means such as, e.g., by means of the "CCL Model 230 Valve Applicator labelling system" which is sold by CCL Industries of 3070 Mainway, Units 16–19, Burlington, Ontario L7M3X1. This system is adapted to be secured to the side of a vertical form-fill and seal machine to apply self-adhesive valve labels to the plastic web on the forming tube section of the machine just prior to the seal and cut station.

Referring again to FIGS. 2D and 2E. after the sealed tray 30 is disposed within the barrier bag 22, solid carbon dioxide 16 is charged into the barrier bag 22 prior to the time the bag is sealed. In general, from about 10 to about 150 grams of solid carbon dioxide is charged to barrier bag 22. For a description of one use of such solid carbon dioxide in a barrier bag without a valve 24, reference may be had to U.S. Pat. Nos. 5,731,023 and 5,737,905. The entire disclosure of each of these United States patents is hereby incorporated by reference into this specification. It should be noted that the amount of solid carbon dioxide used in the processes of these patents is substantially less than the amount of carbon dioxide generally used in applicant's process. In general, a sufficient amount of carbon dioxide is used to generate at least about 1.5 liters of gaseous carbon dioxide per kilogram of perishable goods 15; see, e.g., an article by N. Penney and R. G. Bell entitled "Effect of Residual Oxygen on the Colour, Odour and Taste of Carbon-Dioxide-Packaged Beef, Lamb and Pork . . . " published in Meat Science 33 (1993) at pages 245–252.

Figure 2E:
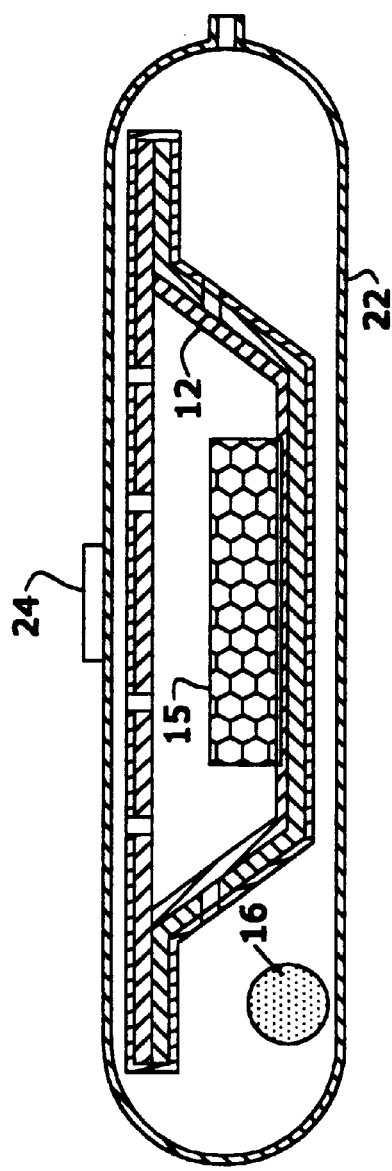

Referring to FIG. 2E, after the solid carbon dioxide is disposed within barrier bag 22, the bag is heat sealed by conventional means; see, e.g., U.S. Pat. Nos. 5,908,676, 5,799,463, 5,759,653, 5,332,121, and the like. The disclosure of each of these United States patents is hereby incorporated by reference into this specification.

In one embodiment, after the barrier bag 22 has been heat sealed, a vacuum is applied through valve 24 to remove air disposed within barrier bag 22.

Figure 3:
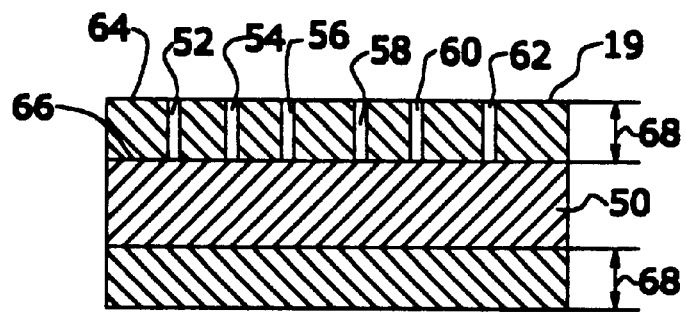
FIG. 3 is a sectional view of a portion of the tray used in the system of FIG. 1.

FIG. 3 is a sectional view, taken through line 3—3 of FIG. 1, of tray 12. Referring to FIG. 3, and to the preferred embodiment depicted therein, it will be seen that tray 12 is comprised of open cell foam 50 to which is attached a skin layer 19 which is preferably comprised of a multiplicity of through-holes 52, 54, 56, 58, 60, and 62. These through holes have a maximum dimension (such as a maximum diameter) of from about 5 to about 40 mils and generally extend from the top surface 64 of the skin layer 19 to the top surface 66 of the open cell foam layer.

In another embodiment, not shown, no such through holes exist in the skin layer 19. In either embodiment, however, the skin layer has a thickness 68 of from about 0.0005 to about 0.01 inches, and, preferably, from about 0.002 to about 0.005 inches.

As will be apparent to those skilled in the art, the structure depicted in FIG. 3 is a laminated structure with one or more skin layers 19 and/or 68. Means for producing such a laminated structure are well known. Thus, by way of illustration, in the process of Example 4 of U.S. Pat. No. 4,510,031, a 0.2 millimeter thick sheet of an ethylene/propylene block copolymer having a density of 0.91 was heat laminated to both surfaces of a foamed sheet. Thus, by way of further illustration, laminates made by bonding a skin layer to a foam core are described in U.S. Pat. Nos. 5,882, 776, 5,876,813, 3,633,459, and the like. Thus, by way of even further illustration, U.S. Pat. No. 4,098,941 discloses a process in which a skin layer is formed in situ on a foam core by heat treatment. The disclosure of each of these United States patents is hereby incorporated by reference into this specification.

The skin layers 19 and/or 68 may be adhered to the foam layer 50 by adhesive means, by heat lamination means, by coextrusion, by mechanical means, and by other conventional means known to those skilled in the art. The skin layer 19 and/or the skin layer 68 may consist essentially of unfoamed plastic (such as polystyrene, or rubber-modified polystyrene, or polyethylene or polypropylene, mixtures thereof, and the like), paper, and the like. In another embodiment, the skin layer 19 and/or the skin layer 68 may consist essentially of either open cell foam and/or closed cell foam.

Without wishing to be bound by any particular theory, applicant believes that the laminated structure possesses substantially more flexural strength than the unlaminated foam core and, in many cases, reaches or exceeds the structural strength of an unlaminated closed cell foam core, such as the ones described in U.S. Pat. No. 5,698,250.

Extrusion Process for Making the Foam Tray 12

Processes for making closed cell polystyrene foam are well known to those skilled in the art. See, e.g., the following United States patents, each of which named the applicant as an inventor: U.S. Pat. Nos. 5,356,944, 5,286,429, 4,747,983, 4,329,052, 4,022,858, 3,953,739, 3,879,507, and the like. The disclosure of each of these United States patents is hereby incorporated by reference into this specification.

Processes for modifying closed-cell polystyrene foam processes to make open cell foam are also well known to those skilled in the art. See, e.g., the article by applicant entitled "Controlling the Properties of Extruded Polystyrene Foam" given at the Proceedings of the International Conference on Polymer Processing held at The Massachusetts Institute of Technology, Cambridge, Mass. in August of 1977 which was published in a book entitled "Science and Technology of Polymer Processing," edited by Nam P. Suh and Nak-Ho Sung (The MIT Press, Cambridge, Mass, 1977). Reference may also be had to U.S. Pat. Nos. 5,798, 409, 5,784,845, 5,646,193, 5,557,896, 5,475,890, 5,434,024, 5,343,109, 5,239,723, 5,139,477, 4,739,522, 4,395,342, 4,259,373, 4,108,600, 4,107,876, 4,082,678, 4,079,170, 3,868,716, 3,844,286, 3,589,592, and the like. The disclosure of each of these United States patents is hereby incorporated by reference into this specification.

As is disclosed in these patents, the conventional process for making polystyrene foam, which is described in the aforementioned patents, uses the well documented extrusion process for producing cellular polystyrene foam in which a solution of a volatile blowing agent in molten polymer, formed in an extruder under pressure, is forced through an orifice into an ambient environment of temperature and pressure. The polymer simultaneously expands and cools under conditions that give it enough strength to maintain dimensional stability at the time corresponding to optimum expansion. Stabilization is due to cooling of the polymer phase to a temperature below its glass transition or melting point. Cooling is effected by vaporization of the blowing agent, gas expansion, and heat loss to the environment.

The polystyrene foam sheet thus produced is allowed to equilibrate with atmospheric gases for a period of from about 1 to about 5 days, at which time it is heat shaped into a container using conventional thermoforming equipment.

Figure 4:
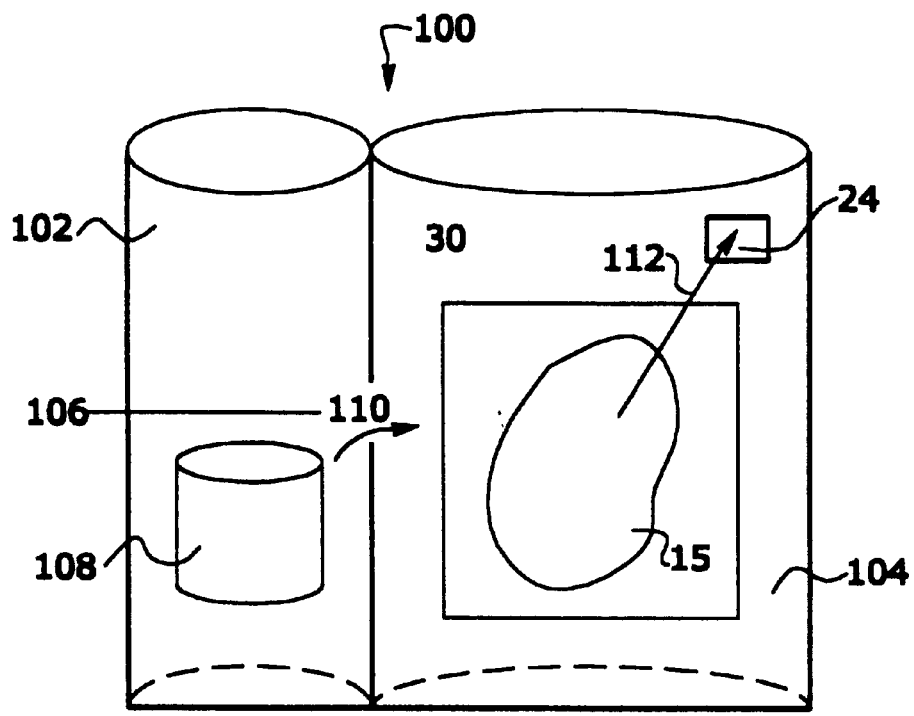
FIG. 4 is a sectional view of one preferred barrier bag which may be used in the packaging system of FIG. 1.

FIG. 4 is a schematic view of another system for preserving perishable goods in which a two compartment barrier bag comprised of compartment 102 and compartment 104 communicate with each other via an orifice 106. A chunk of solid carbon dioxide 108 gradually sublimes causing gas to travel via arrows 110 and 112 and, when pressure has built up, to vent through valve 24. The system of this FIG. 4 is very similar to the system depicted in FIG. 1, with the exception that it utilizes a two-compartment banier bag rather than a single compartment barrier bag.

Figure 5:
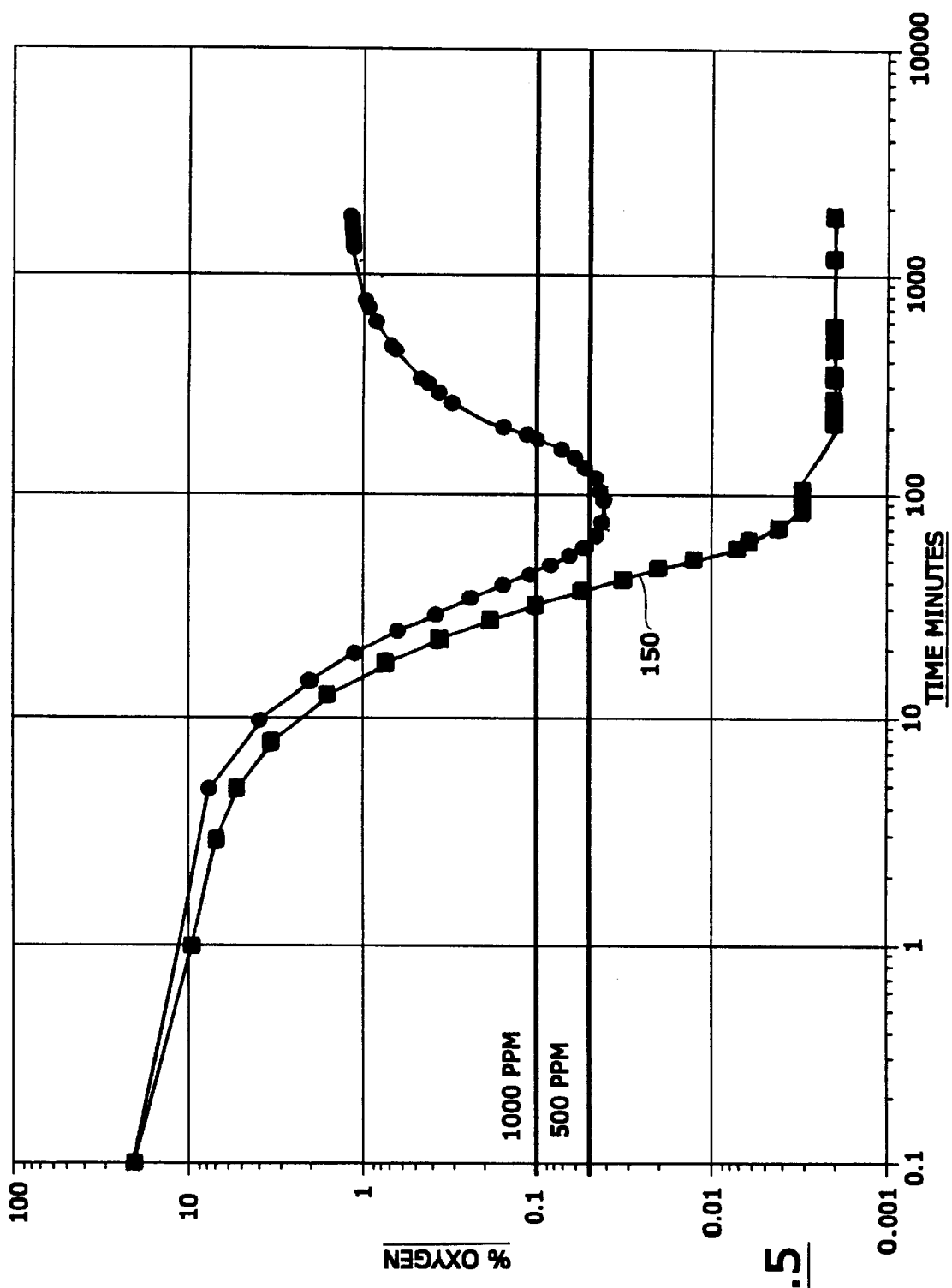
FIG. 5 is a graph illustrating the oxygen concentrations in a specified packaging material over time with two systems, one of which uses a conventional foam tray, and the other of which uses the open-cell foam tray of this invention.

FIG. 5 is a graph presenting data generated from the experiments of the Examples described in applicant's copending patent application Ser. No. 09/342,844.

Another Preferred Packaging System of the Invention

Figure 6:
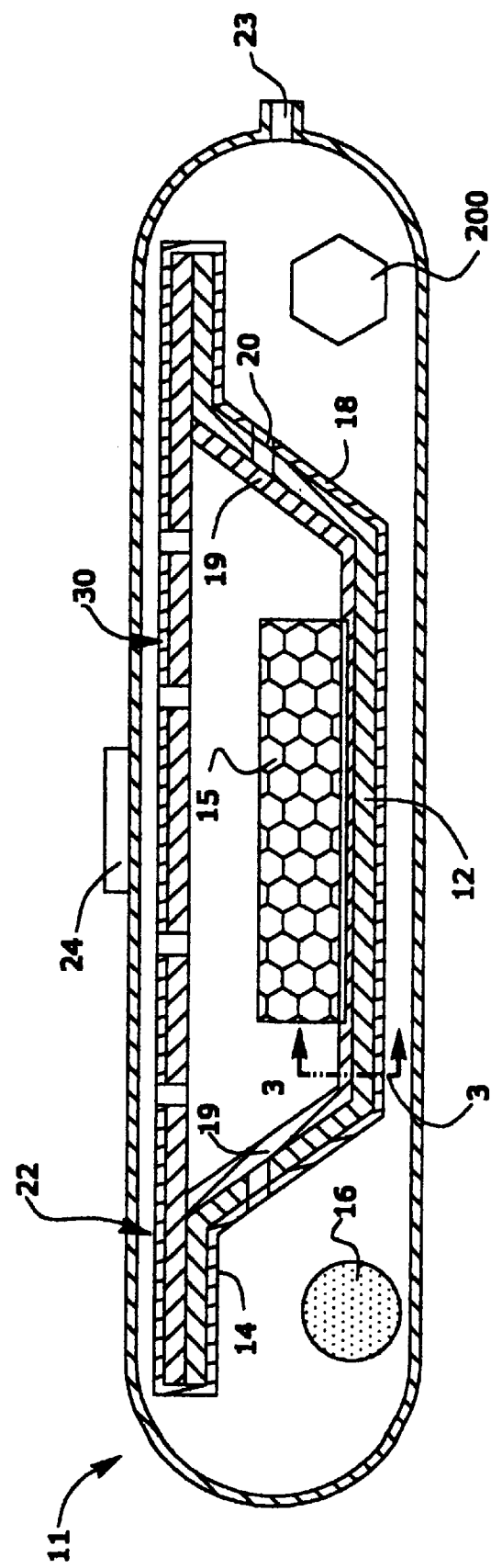
FIG. 6 is a sectional view of another preferred packaging system of the invention.

FIG. 6 shows an packaging system 11 which is substantially identical to the packaging system 10 depicted in FIG. 1 but which differs from packaging system 10 in that it contains oxygen absorber 200.

One may use any of the commercially available oxygen absorbers as oxygen absorber 200. One preferred oxygen absorber 200 is an iron-based oxygen absorber such as, e.g., the ironbased absorbent described in U.S. Pat. No. 5,928, 960. The entire disclosure of this United States patent is hereby incorporated by reference into this specification.

Further reference may be had to U.S. Pat. No. 5,262,375, which also discusses oxygen absorber packets. The entire disclosure of this patent is hereby incorporated by reference into this specification.

One oxygen absorber packet which may be used in the process of this invention is manufactured by Multiform Dessicants Incorporated of North Tonawanda, New York. It is believed that this absorber packet contains iron and silica gel.

Other iron-based oxygen absorbers also will work well as oxygen absorber 200.

Referring again to FIG. 6, and in the preferred embodiment depicted therein, the solid carbon dioxide 16 preferably is in particulate form and has a particle size distribution such that at least about 90 weight percent of its particles are sized in the range from about 25 microns to about 1,000 microns and, more preferably, are sized in the range of from about 100 to about 500 microns. In one embodiment, at least about 90 weight percent of the carbon dioxide particles are in the range of from 200 to about 400 microns.

In the embodiment depicted in FIG. 6, it is preferred that the barrier bag 22 have an oxygen permeability of less than 10 cubic centimeters per 100 square inches per 24 hours, as measured by suitable gas permeability measuring device.

Referring again to FIG. 6, and in the preferred embodiment depicted therein, the tray 12 preferably has a water absorbency of from about 5 to about 500 percent. In the test used to determine water absorbency, a tray is weighed under ambient conditions and then immersed in water for a period of thirty minutes. Thereafter, the tray is removed from the water bath and weighed. The ratio of the weight of the "wet tray" to that of the "dry tray" is at least about 2.0/1.0 and, preferably, at least 2.5/1.0. A tray with the desired characteristics is commercially available form Vitembal S. A. of Remoulins, France, as the "Integral" absorbent tray.

A Process of Limiting the Expansion the Barrier Bag

Figure 7:
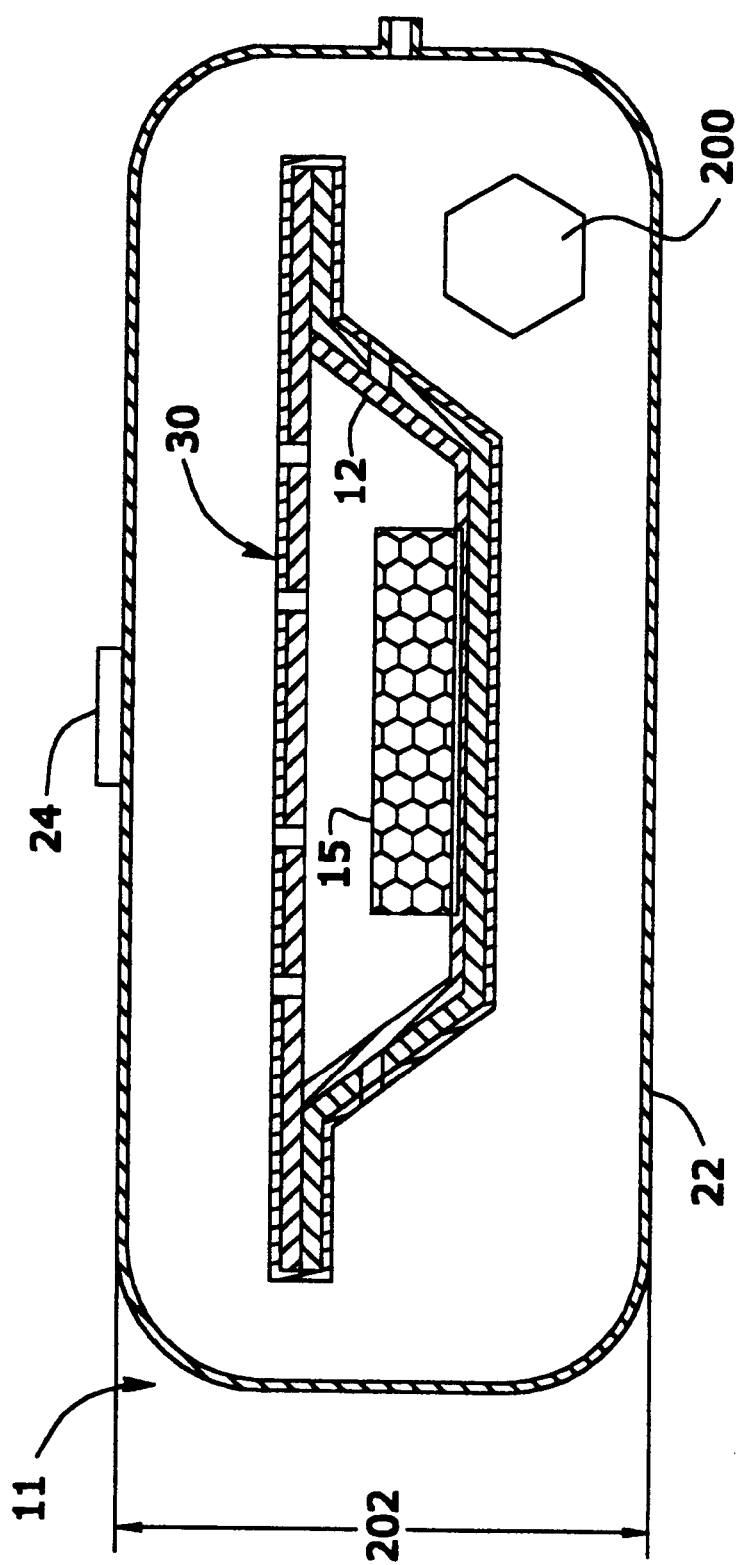
FIG. 7 illustrates a process for making a packaging system in which the barrier bag expands during the process.

FIG. 7 illustrates the condition of packaging system 11 (see FIG. 6) after the carbon dioxide 16 has sublimated and is released through valve 24. Certain components of packaging system 11 have been omitted from FIG. 7 for the sake of simplicity of representation.

Referring to FIG. 7, it will be seen that barrier bag 22 has a height 202 which is substantially greater than the height of the barrier bag 22 depicted in FIG. 6. As will be apparent to those skilled in the art, this occurs because the sublimation of the solid carbon dioxide produces a gaseous phase which increases the pressure within barrier bag 22. Some of this pressure is vented to atmosphere via valve 24, but some of the pressure causes barrier bag 22 to increase in volume. If the expansion of barrier bag 22 is unrestrained, and depending upon the concentration of the solid carbon dioxide 16, the volume enclosed by barrier bag 22 could increase by as much as 1,500 percent.

When the packaging system 11 has a large volume, it is difficult to ship efficiently and is more cumbersome to use.

Figure 8:
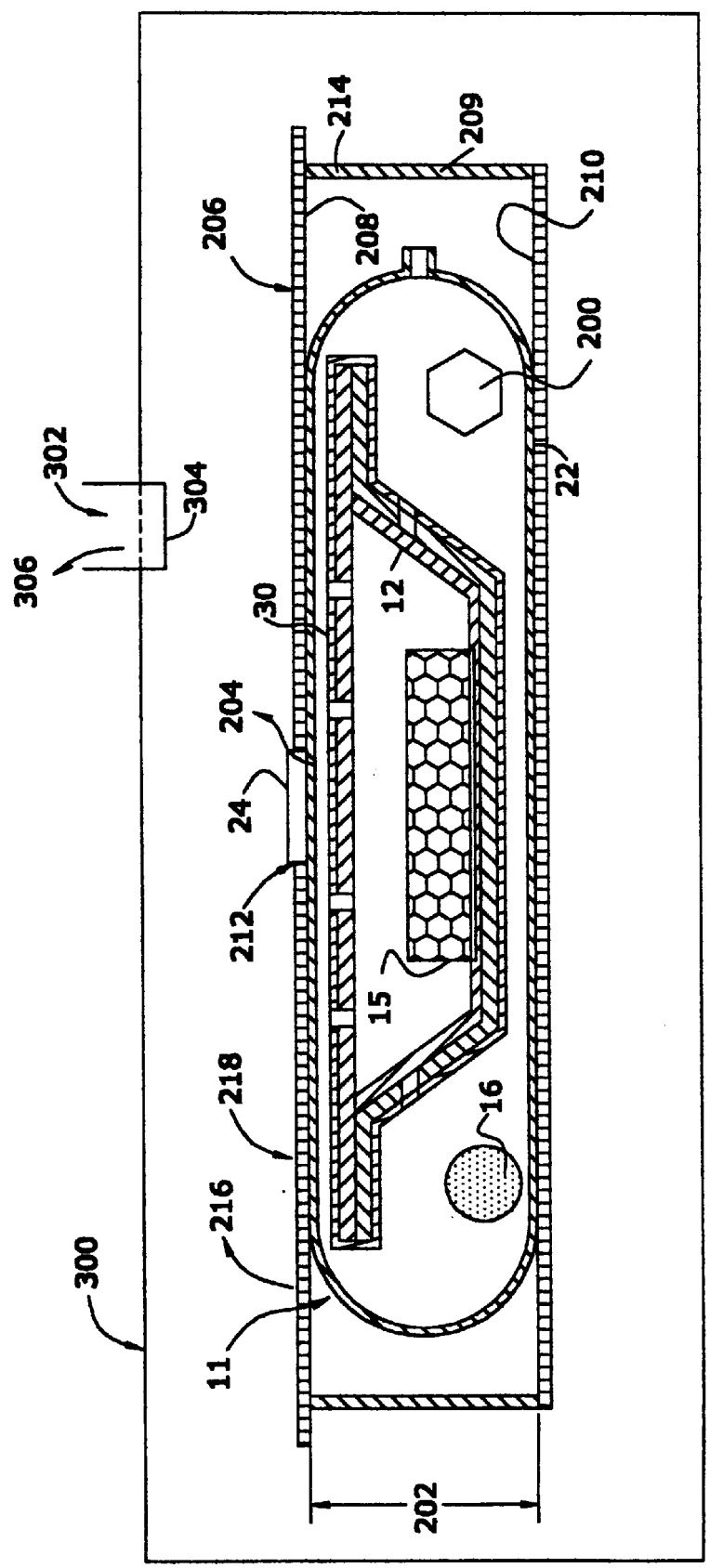
FIG. 8 illustrates a process for limiting the extent to which the barrier bag can expand during the process.

FIG. 8 illustrates a process for limiting the increase in volume of the barrier bag 22. Referring to FIG. 8, it will be seen that the solid carbon dioxide 16 within barrier bag 22 causes sublimate to flow in the direction of arrow 204 through valve 24. It also causes the barrier bag 22 to expand in volume, but such volume expansion is limited by the presence of constraint 206. In the particular embodiment depicted, constraint 206 is comprised of opposing walls 208 and 210 which are separated by distance 202. An orifice 212 disposed within wall 208 is adapted to receive valve 24 and to allow gas passing through valve 24 to exit the constraint 206. Depending upon the extent of distance 202, the extent to which the barrier bag 22 will be allowed to expand during sublimation of the solid carbon dioxide 16 can be controlled.

One may use any suitable means for controlling the expansion of the volume within barrier bag 22. In one embodiment, not shown, wall 208 is hingeably attached at point 214 to wall 209 and may be rotated upwardly in the direction of arrow 216 and/or downwardly in the direction of arrow 218, thereby varying the effective distance 202 between wall 208 and wall 210 at various points along such wall. Other suitable means for controlling the expansion of the volume within barrier bag 22 will be apparent to those skilled in the art.

In one embodiment, the restraining means is comprised of shrink film which is used as the barrier bag 22 (see, e.g., FIG. 1). This shrink film barrier bag 22 is preferably oxygen-impermeable. Some suitable oxygen-impermeable shrink films are described, e.g., in U.S. Pat. Nos. 5,645,788, 5,482,770, 5,376,394, 5,302,402, 5,035,8512, 4,894,107, and the like. The disclosure of each of these United States patents is hereby incorporated by reference into this specification.

As will be apparent, once the shrink film barrier bags 22 are heat treated, they resist deformation by gas pressure, thereby effectively reducing the volume of the system and restraining expansion of the package.

Referring again to FIG. 8, and in the preferred embodiment depicted therein, the packaging device 11 constrained by constraint 206 is disposed within a vacuum chamber 300 comprised of a port 302. Sublimate exiting constraint 206 through valve 24 then can exit vacuum chamber 300 through valve 304 in the direction of arrow 306.

As will be apparent to those skilled in the art, the presence of a vacuum within vacuum chamber 300 facilitates the removal of oxygen from barrier bag 22. It is preferred that the vacuum within vacuum chamber 300 be less than 10.0 millimeters of mercury absolute. This will cause the pressure within barrier bag to be less than about 10.0 millimeters of mercury absolute.

Figure 9:
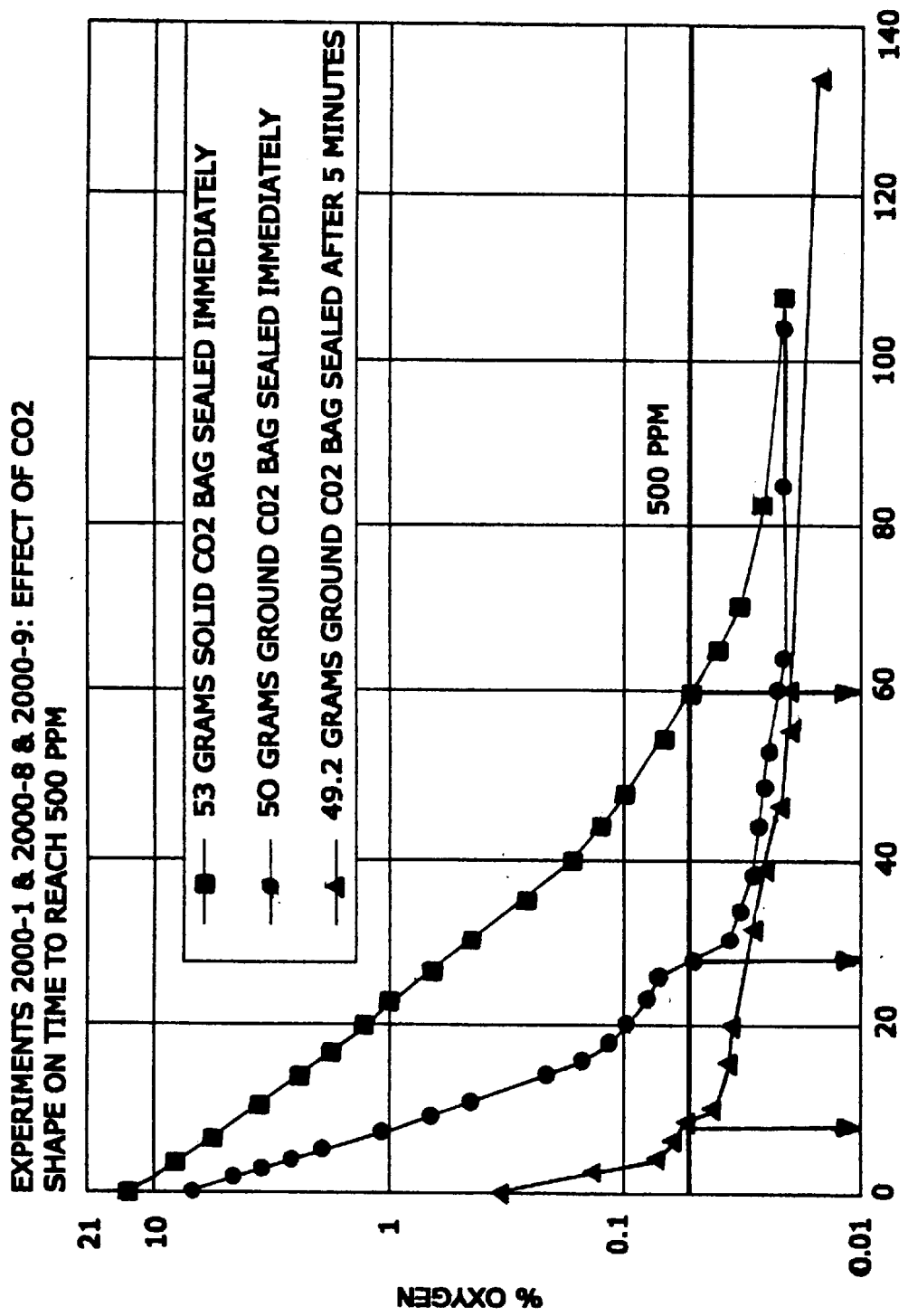
FIG. 9 is a graph illustrating how the use of granulated carbon dioxide affects the preferred process.
Figure 10:
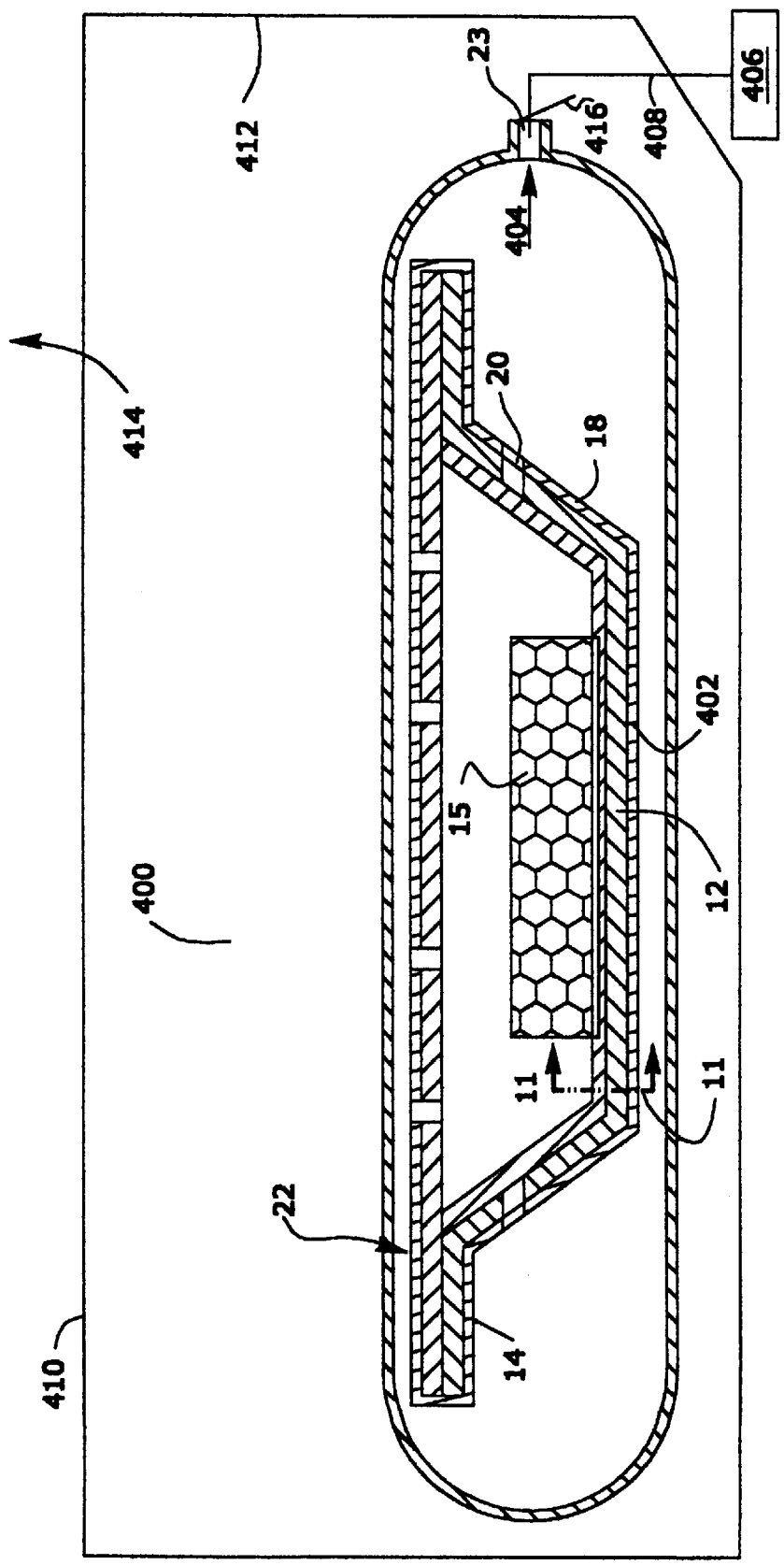
FIG. 10 is schematic representation of one preferred packaging system of this invention.

FIG. 9 is a graph presenting data from an experiment in which various processing parameters were varied. Utilizing a setup such as that disclosed in FIG. 2E, an experiment was conducted in which 53 grams of solid carbon dioxide, in the form of a block, were disposed within a barrier bag 22 with an internal volume of 250 cubic centimeters, and the bag was thereafter immediately heat sealed to isolate its interior volume from ambient conditions. Sublimate was then allowed to escape through valve 24, and measurements were taken of the oxygen concentration within the barrier bag 22 at various points in time. This system took 60 minutes to reach an oxygen concentration as low as 500 parts per million.

The experiment described above was repeated, with the exception that 50 grams of carbon dioxide in particulate form was substituted for the 53 grams of carbon dioxide in block form. The particulate carbon dioxide had a particle size distribution such that at least 95 percent of its particles were within the range of 25 microns to 1,000 microns. Using these conditions, the system took only about 27 minutes to reach an oxygen concentration as low as 500 parts per million.

The experiment described above which used particulate carbon dioxide was substantially repeated, but only 49.2 grams of particulate carbon dioxide were used. Furthermore, instead of immediately sealing barrier bag 22 after charging the particulate carbon dioxide to it, the barrier bag was sealed five (5.0) minutes after the carbon dioxide was charged. Using these conditions, the system took only about 7 minutes to reach an oxygen concentration as low as 500 parts per million.

Thus, it is apparent that, by using particulate carbon dioxide, and by not sealing the barrier bag 22 immediately after charging such carbon dioxide, the efficiency of the system can be increased by at least about 600 percent. Furthermore, it is advantageous, when using this improved process, to also utilize one or more of the improvements described in FIG. 8.

Section Two: Another Packaging System of the Invention

FIG. 10 is a sectional view of a preferred packaging system 400 which is similar to the packaging system 10 of FIG. 1, containing the identical elements 12, 14, 15, 18, 20 and 23. However, the the cross-sectional structure 402 differs. This cross-sectional structure is illustrated in FIG. 11.

Figure 11:
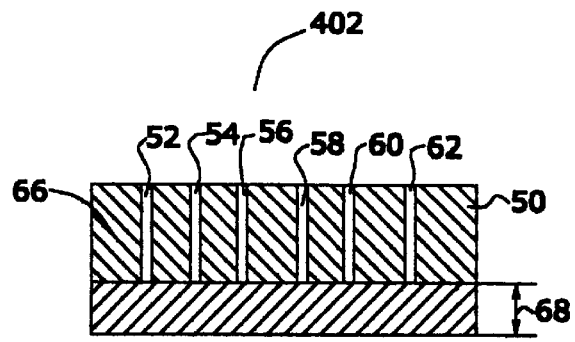
FIG. 11 is a sectional view of the system of FIG. 10.

Referring to FIG. 11, cross-sectional structure 402 is similar to the cross-sectional structure depicted in FIG. 3 with the exception that skin layer 68 is disposed on the bottom of structure 402; in the structure of FIG. 3, by comparison, skin layer 19 is disposed on the top. Thus, as will be apparent, the tray of the assembly 400 preferably has its skin layer at the bottom of such tray.

Referring again to FIG. 11, the laminated structure therein preferably comprises two layers, layers 50 and 68. The holes 52, 54, 56, 58, 60, and 62 are disposed within layer 50; and the 66 denotes the top surface of open cell foam layer 50.

Applicant has discovered that the structure depicted in FIGS. 10 and 11 is substantially superior to the structure depicted in FIG. 1 in its performance characteristics.

In one embodiment, not shown, the structure depicted in FIGS. 10 and 11 is modified so that another skin layer 68 appears on top of loam layer 50, thereby forming a three-layer laminated structure.

Referring again to FIG. 10, and in the preferred embodiment depicted therein, it will be noted that valve 24 and no solid carbon dioxide 16 (see FIG. 1) are required in this embodiment. Instead, a vaccum is applied in the direction of arrow 404 through opening 23 by vacuum means 406 (such as vacuum pump 406) connected to opening 23 by line 408.

In the embodiment depicted in FIG. 10), the assembly 400 is preferably disposed within a chamber 410 comprised of port 412 adapted for the introduction of packaging gas 414) into the chamber 410.

It is preferred to apply a vacuum to orifice 23 until all of the ambient air is withdrawn both from chamber 410 and assembly 400. It is preferred to remove all of the oxygen from the interstices of tray 12. Although the conditions will vary from tray to tray, and chamber to chamber, in general one may apply a vacuum of from about less than about 1 millimeter mercury until the oxygen content within tray 12 is less than about 0.05 volume percent.

Once vacuum pump 406 has evacuated substantially all of the oxygen from assembly 400, inert gas may be introduced via port 412. One may use carbon dioxide, mixtures of carbon dioxide and nitrogen, pure nitrogen, and other inert gases well known to those skilled in the art. It is preferred to use carbon dioxide in that it tends to inhibit the growth of bacteria.

Once the assembly 400 has had substantially all of its oxygen removed from it, barrier bag 22 may be sealed at opening 23 by closure 416. Any suitable closure may be used. Alternatively, or additionally, barrier bag 22 may be sealed by heat sealing means.

In the embodiment depicted in FIG. 1, only one tray assembly is shown disposed within the barrier bag 22. In another embodiment, not shown, two or more tray assemblies are disposed within the barrier bag.

In one embodiment, and referring to FIG. 10, the tray 12 is comprised of a material which, in use, generates chlorine dioxide. In one aspect of this embodiment, the tray is comprised of from about 0.01 to about 25 weight percent of a water-soluble metal chlorite.

As is known to those skilled in the art, when metal chlorite is in the presence of water and acid, it produces chlorine dioxide, which is an F.D.A. approved disinfectant. See, e.g., U.S. Pat. Nos. 5,389,390, 5,364,650, 5,234,703, 4,362,753, 4,244,978, 4,021,585, and the like. The entire disclosure of each of these patents is hereby incorporated by reference into this specification.

One may incorporate metal chlorite into the tray by conventional means. Thus, e.g., an aqueous solution of sodium chlorite, e.g., at a concentration of from about 0.01 to about 20 weight percent, may be applied to the tray 12, which will absorb it.

In one embodiment, the tray 12 is comprised of from about 0.5 to about 25 weight percent of an anionic surfactant such as, e.g., "HOSTAPUR" surfactant sold by the Hoechst Chemical Corporation. "HOSTAPUR" is the sodium salt of an alkane sulfonic acid. Other suitable ionic surfactants which promote water absorption in the tray 12 also may be used.

When the tray 12 with comprising the water-soluble metal chlorite is contacted with both carbon dioxide (form the atmosphere) and water (from the goods 15 disposed within the package), a mild acid (carbonic acid) will be formed which will faciliate the formation of chlorine dioxide from the metal chlorite.

In another embodiment, not shown, solid metal chlorite is incorporated as tab on tray 12, or within a sachet on tray 12, or by similar means.

The tray 12, and the assembly 400, have been shown for use in preserving perishable items, such as meat. However, these devices have other uses. Thus, for example, they may be used for maintaining medical items in a bacteria-free state, for maintaining electronic equipment in an oxidation-free state, etc.

A Tray with a Hinged Attachment

Figure 12:
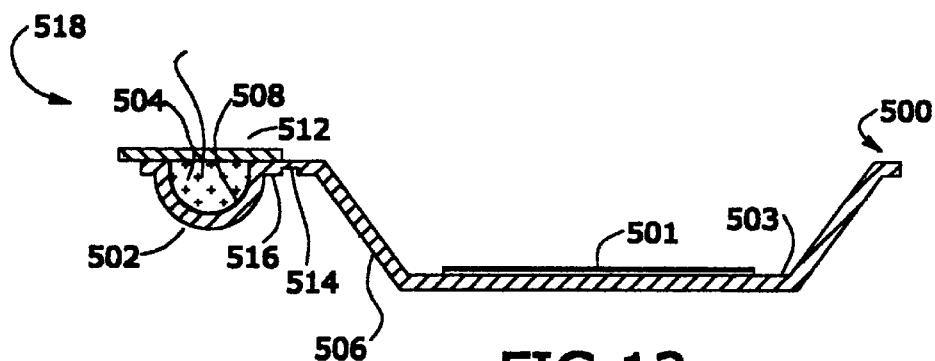
FIG. 12 is a sectional view of another preferred tray of the invention.

FIG. 12 is a side sectional view of a tray 500 which contains a hinged attachment 502 comprised of a receptacle 504 for receipt of a source of carbon dioxide (not shown). In the embodiment depicted, only one hinged attachment 502 is shown, attached to wall 506 of tray 500. In another embodiment, not shown, a second and/or a third and/or a fourth such hinged attachment is attached to one or more of the other walls of the tray.

The receptacle 504 is adapted to receive a source of carbon dioxide. By this term, applicant refers to any material or materials which, under ambient conditions, will generate carbon dioxide gas. Thus, by way of illustration and not limitation, one may use dry ice in various sizes and forms (such as ground powder or pellets), a stoichiometric mixture of citric acid and sodium bicarbonate, and the like.

Referring again to FIG. 12, and in the preferred embodiment depicted therein, the receptacle 504 is coated with an adhesive 508 which will tend to retain the source of carbon dioxide within the receptacle 504. Any material may be used which will effect the adhesive purpose without interfering with the conversion of the carbon dioxide source into gaseous carbon dioxide. Thus, by way of illustration, a commercially available glue may be used as adhesive 508.

Referring again to FIG. 12, particulate matter 510 is shown disposed within receptacle 504, and a seal 512 is shown covering receptacle 504 and preventing the particulate matter within receptacle 510 from contacting the outside atmosphere. When one is ready to pack meat in tray 500, one can then remove seal 512 and allow the material in the receptacle to contact the atmosphere.

Thus, by way of illustration, the particulate matter 510 disposed within receptacles 504 may be the aforementioned stoichiometric mixture of citric acid and sodium bicarbonate. As is known to those skilled in the art, when this mixture is exposed to moisture, it will react and produce gaseous carbon dioxide and sodium citrate, neither of which contaminate food items.

Thus, by way of further illustration, the particulate matter 510 disposed within receptacle 504 may consist of or comprise a material, which upon exposure to moisture, produces chlorine dioxide. Particulate water-soluble metal chlorite serves this purpose, as is discussed elsewhere in this specification.

Thus, by way of further illustration, the particulate matter 510 disposed within receptacle 504 may comprise the iron-based oxygen absorbing material described elsewhere in this specification.

The hinged attachment 502 is hingably attached to the main body of the tray 500 and, in the embodiment depicted, to wall 506. One may use any means of making such hinged attachment. Thus, e.g., wall 506 and hinged attachment 502 may be integrally connected to each other and hingably moved vis-a-vis each other due to the natural resiliency of tray 500 and the material from which it is made. Thus, e.g. a receptacle (not shown), such as a plastic or paper pouch, can be adhesively attached to one wall of the tray, and/or attached to such wall by other attachment means.

Figure 16:
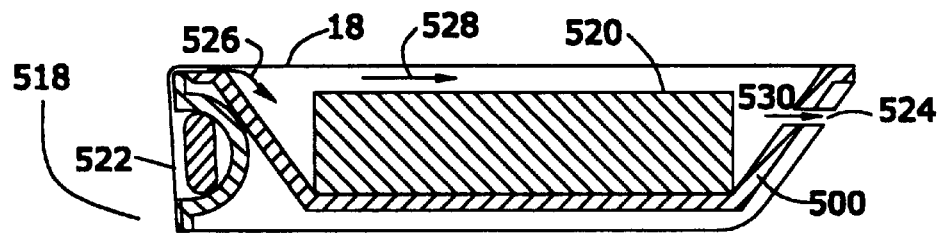
FIG. 16 illustrates the device of FIG. 15, after it has been wrapped with film and a vent hole has been punched therein.

One preferred means of making such a hingable connection is illustrated in FIG. 12. Referring to FIG. 12, it will be seen that a stress-relief indentation 514 is cut, formed, or compressed within the lower wall 516 of the attachment 502. As will be apparent to those skilled in the art, when force is applied to attachment 502 in the direction of arrow 518, the attachment 502 will tend to pivot downwardly towards wall 506. FIG. 16 illustrates the position of attachment 502 after force has been applied in the direction of arrow 518.

In one embodiment, the tray depicted in FIG. 12 is substantially identical to the open-cell foam tray 12 described elsewhere in this specification. In this embodiment, at least about 20 volume percent of the foam material in the tray is open cell foam comprised of a multiplicity of open cells with an average cell diameter of from about 0.001 to about 0.020 inches.

In another embodiment, the tray depicted in FIG. 12 is comprised of solid, non-porous, unfoamed plastic or thermoplastic material, or metal (such as aluminum). Thus, such tray may be made from polypropylene, polystyrene, polyethylene, polyvinylchloride, polyester, and the like.

The solid trays will typically have a porosity of less than about 5 percent and, thus, is not capable of absorbing sufficient quantities of water. Thus, when a perishable item such as meat is placed into such a solid tray, liquid exuding from the meat will collect in the bottom of the tray, thereby producing an aesthetically displeasing package.

One means of avoiding this problem is illustrated in FIG. 12. As is illustrated in the embodiment depicted in FIG. 12, a layer 501 of the absorbent open-cell foam material may be adhesively attached to the bottom interior wall 503 of tray 500. This absorbent open-cell foam material may have the same properties, or properties similar to, the open-cell foam material described elsewhere in this specification.

In one embodiment, the layer 501 is disposed but not adhered to the bottom interior wall 503 of tray 500.

Figure 13:
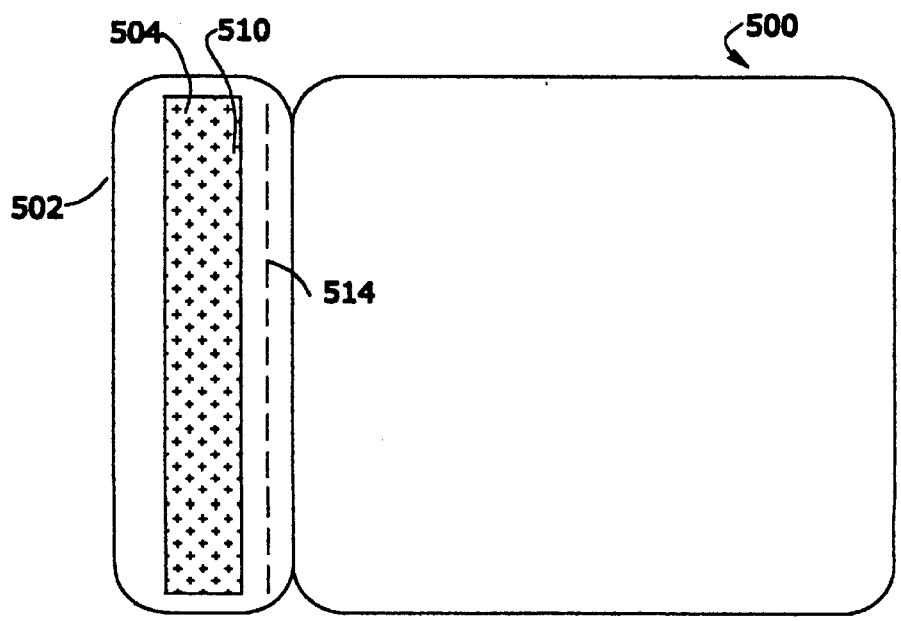
FIG. 13 is a top view of the tray of FIG. 12.

FIG. 13 is a top view of the tray of FIG. 12 from which unnecessary detail has been omitted for the sake of simplicity of representation.

Figure 14:
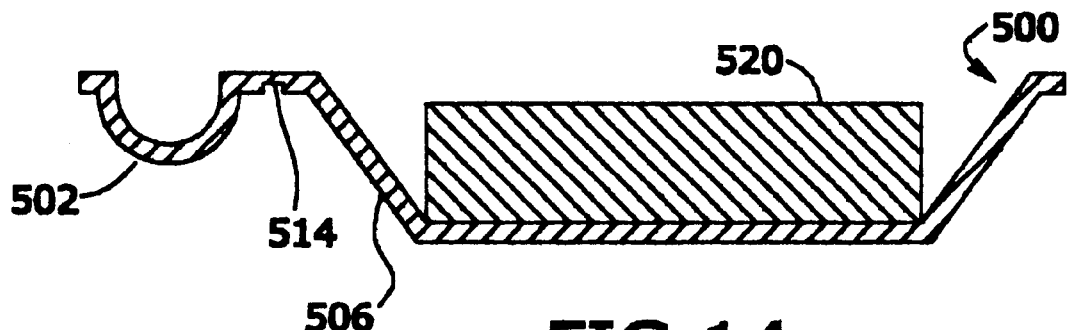
FIG. 14 is a sectional view of the tray of FIG. 12 after meat has been disposed in it.

FIG. 14 is a sectional view of the tray of FIG. 12 from which unnecessary detail has been omitted for the sake of simplicity of representation. As illustrated in FIG. 14, in the first step of the process of this invention a perishable item 520 is placed within the tray 500, preferably substantially in the center of the tray. The location of the perishable item within the tray 500 is not critical. In one embodiment, perishable item 520 is fresh meat.

Figure 15:
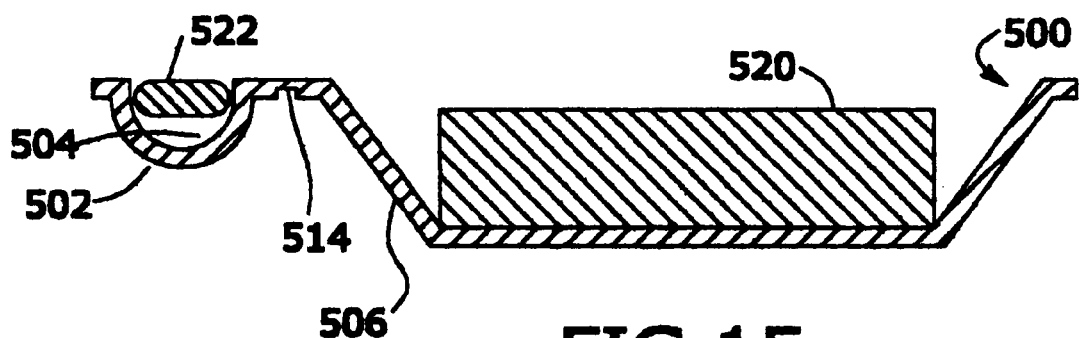
FIG. 15 is a sectional view of the tray of FIG. 12 after meat has been placed in it in it and a source of carbon dioxide has been charged into a receptacle located within a hinged attachment to the tray.

As is depicted in FIG. 15, in the next step of the process a source of carbon dioxide 522 is then placed within receptacle 504. It is preferred to charge the carbon dioxide source to receptacle 504 within no more than 60 minutes after the perishable item 520 is placed in the tray 500.

Referring to FIG. 16, the assembly depicted in FIG. 15 is then overwrapped with a film 18, which film is described elsewhere in this specification. Thereafter, a hole 524 is punched through the film 18 and the tray 500.

In the configuration depicted in FIG. 16, carbon dioxide from carbon dioxide source 522 is free to travel in the direction of arrows 526, 528, 528. Thus, e.g., when the source of carbon dioxide is dry ice, such dry ice will sublimate and cause the carbon dioxide to flow through the system and out of orifice, thereby also purging the system of oxygen contained therein.

Figure 17:
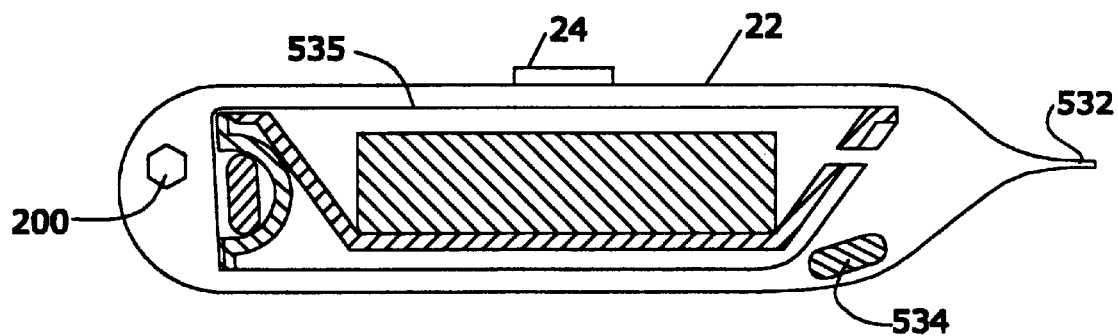
FIG. 17 illustrates the device of FIG. 16 after it has been placed within a barrier bag fitted with a valve and a means for sealing the bag.

In the configuration depicted in FIG. 17, the assembly depicted in FIG. 16 is disposed within a barrier bag 22 comprised of a valve 24. This new assembly can be evacuated and back-flushed with carbon dioxide, and/or mixtures of carbon dioxide and nitrogen. Alternatively, or additionally, the bag can be sealed after a second source of carbon dioxide 534 is placed within the barrier bag but outside of the sealed tray assembly. In addition to the second source of carbon dioxide 534, one may also dispose an oxygen-absorbing agent 200 within the barrier bag but outside of the sealed tray assembly.

Figure 18:
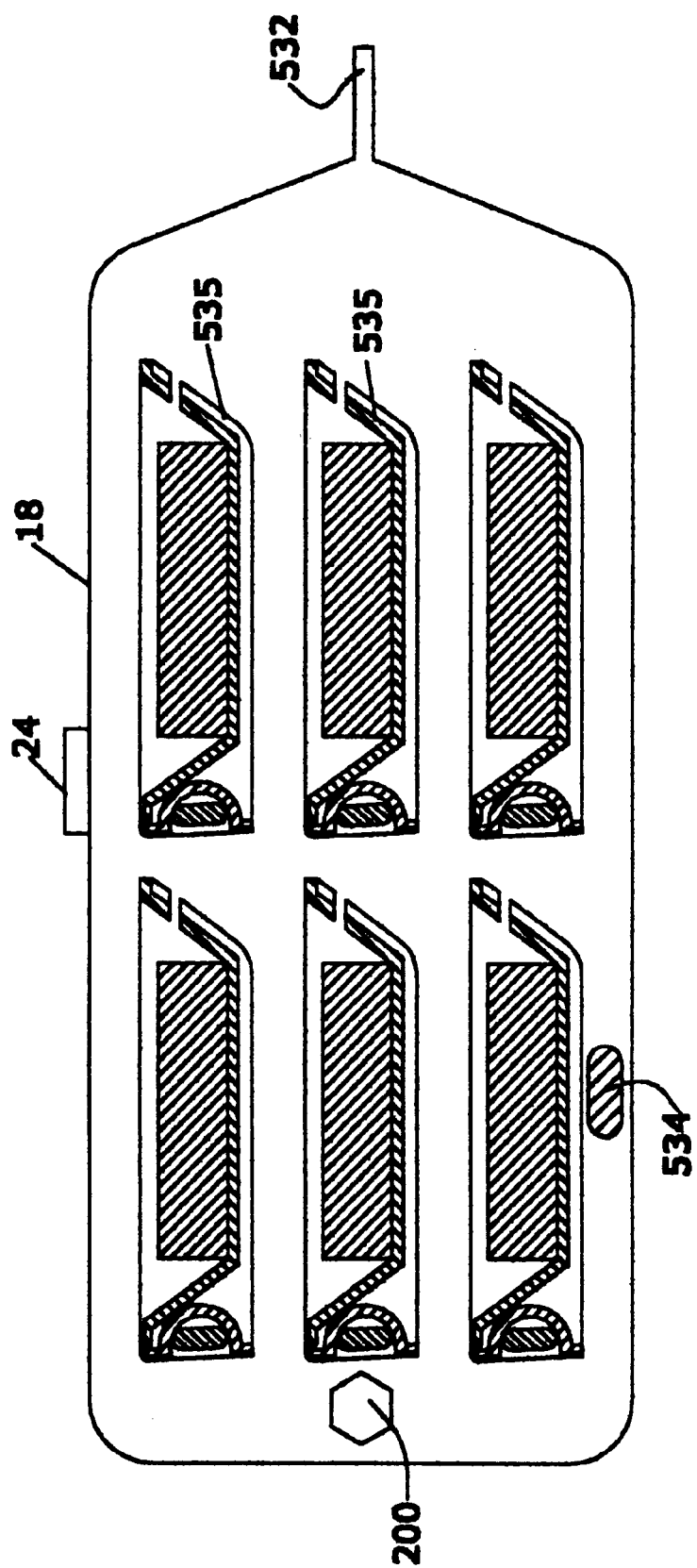
FIG. 18 illustrates a multiplicity of the devices of FIG. 16 disposed within a master barrier bag outfitted with a valve and sealing means.

In the embodiment depicted in FIG. 17, one overwrapped tray assembly 535 is disposed within a barrier bag 22. In the embodiment depicted in FIG. 18, a multiplicity of overwrapped tray assemblies 535 are disposed within a master barrier bag 18.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

Thus, in one embodiment, and referring to FIG. 12, adhesive layer 508 may be replaced with a metallized or metal-containing layer 508 which will readily be heated up to high temperatures either by microwaves and/or sonic waves and/or light. Thereafter, if a mixture of sodium bicarbonate and citric acid is disposed within receptacle 504, and/or microwave and/or sonic energy and/or light energy is selectively directed towards receptacle 504, the layer 508 will heat up and will melt the mixture of sodium bicarbonate and citric acid, thereby causing it to produce carbon dioxide. Other selective means of preferentially directing energy to the mixture of sodium bicarbonate and citric acid also may be used.

Thus, in another embodiment, a second hinged assembly 502 is utilized which contains material(s) which will generate oxygen upon exposure to certain specified conditions and which can be used when it is desired to "bloom" the meat product in the tray prior to sale. Thus, e.g., the second receptacle 504 may contain two or more compartments which contain materials which, when combined, will generate oxygen.

I claim:

1. A modified atmosphere package for storing oxygen sensitive goods, comprising a gas permeable tray for holding the oxygen-sensitive goods, a gas permeable film positioned over and adjacent to said tray forming a first wrapped tray, a barrier bag with an inside surface and an outside surface within which said first wrapped tray is disposed, and a pressure relief valve located on said outside surface of said barrier bag, wherein:

(a) said gas permeable tray is comprised of foam material, wherein at least about 20 volume percent of said foam material is open cell foam comprised of a multiplicity of open cells, said open cells comprise a gas phase which comprise from about 19 to about 22 volume percent of oxygen and from about 78 to about 81 volume percent of nitrogen, and said open cells have an average cell diameter of from about 0.001 to about 0.020 inches, (b) said gas permeable tray is comprised of a bottom wall and at least one side wall integrally connected to said bottom wall and extending upwardly and outwardly from said bottom wall at an angle of from about 10 to about 85 degrees, wherein each of said bottom wall and said side wall have a thickness of from about 0.025 to about 0.35 inches, (c) said gas permeable tray has a density of from about 0.5 to about 15 pounds per cubic foot, (d) a film of gas permeable material is disposed over and contiguous with said bottom wall of said gas permeable tray, (e) said barrier bag has an oxygen permeability of less than 5 cubic centimeters per 100 square inches per 24 hours, and (f) said tray is comprised of a first wall and a first hinged flap integrally connected to said first wall of said tray, wherein said first hinged flap is comprised of a first receptacle.

2. The modified atmosphere package as recited in claim 1, wherein a source of carbon dioxide is disposed within said first receptacle.

3. The modified atmosphere package as recited in claim 1, wherein said first receptacle is comprised of an arcuate section with an inner curved wall and an outer curved wall.

4. The modified atmosphere package as recited in claim 3, wherein a coating of adhesive material is disposed on said inner curved wall.

5. The modified atmosphere package as recited in claim 2, wherein a source of chlorine dioxide is disposed within said first receptacle.

6. The modified atmosphere package as recited in claim 2, wherein an oxygen-absorbing material is disposed within said first receptacle.

7. The modified atmosphere package as recited in claim 1, wherein said first hinged flap is comprised of first means for sealing said receptacle.

8. The modified atmosphere package as recited in claim 1, wherein said tray is comprised of a second wall and a second hinged flap integrally connected to said second wall of said tray, wherein said second hinged flap is comprised of a second receptacle.

9. The modified atmosphere package as recited in claim 8, wherein said second receptacle is comprised of a source of oxygen.

10. The modified atmosphere package as recited in claim 1, wherein from about 2 to about 25 wrapped trays are disposed within said barrier bag, wherein each of said wrapped trays is produced by a process in which a gas permeable film is positioned over and adjacent to a gas permeable tray, and wherein:

(a) said gas permeable tray is comprised of foam material, wherein at least about 20 volume percent of said foam material is open cell foam comprised of a multiplicity of open cells, said open cells comprise a gas phase which comprise from about 19 to about 22 volume percent of oxygen and from about 78 to about 81 volume percent of nitrogen, and said open cells have an average cell diameter of from about 0.001 to about 0.020 inches, (b) said gas permeable tray is comprised of a bottom wall and at least one side wall integrally connected to said bottom wall and extending upwardly and outwardly from said bottom wall at an angle of from about 10 to about 85 degrees, wherein each of said bottom wall and said side wall have a thickness of from about 0.025 to about 0.35 inches, (c) said gas permeable tray has a density of from about 0.5 to about 15 pounds per cubic foot, (d) a film of gas permeable material is disposed over and contiguous with said bottom wall of said gas permeable tray, and (e) said tray is comprised of a first wall and a first hinged flap integrally connected to said first wall of said tray, wherein said first hinged flap is comprised of a first receptacle.

11. The modified atmosphere package as recited in claim 1, wherein a source of carbon dioxide is disposed within said barrier bag but outside of said first wrapped tray.

12. The modified atmosphere package as recited in claim 1, wherein a source of carbon dioxide is disposed within said barrier bag.

13. The modified atmosphere package as recited in claim 10, wherein a source of carbon dioxide is disposed within said barrier bag but outside of each of said wrapped trays.

14. The modified atmosphere package as recited in claim 10, wherein a source of carbon dioxide is disposed within said barrier bag.

* * * * *